No. 846,214. PATENTED MAR. 5, 1907.
F. R. KELLER.
VOLTAGE REGULATOR FOR ALTERNATING CURRENT GENERATORS.
APPLICATION FILED OCT. 22, 1906.
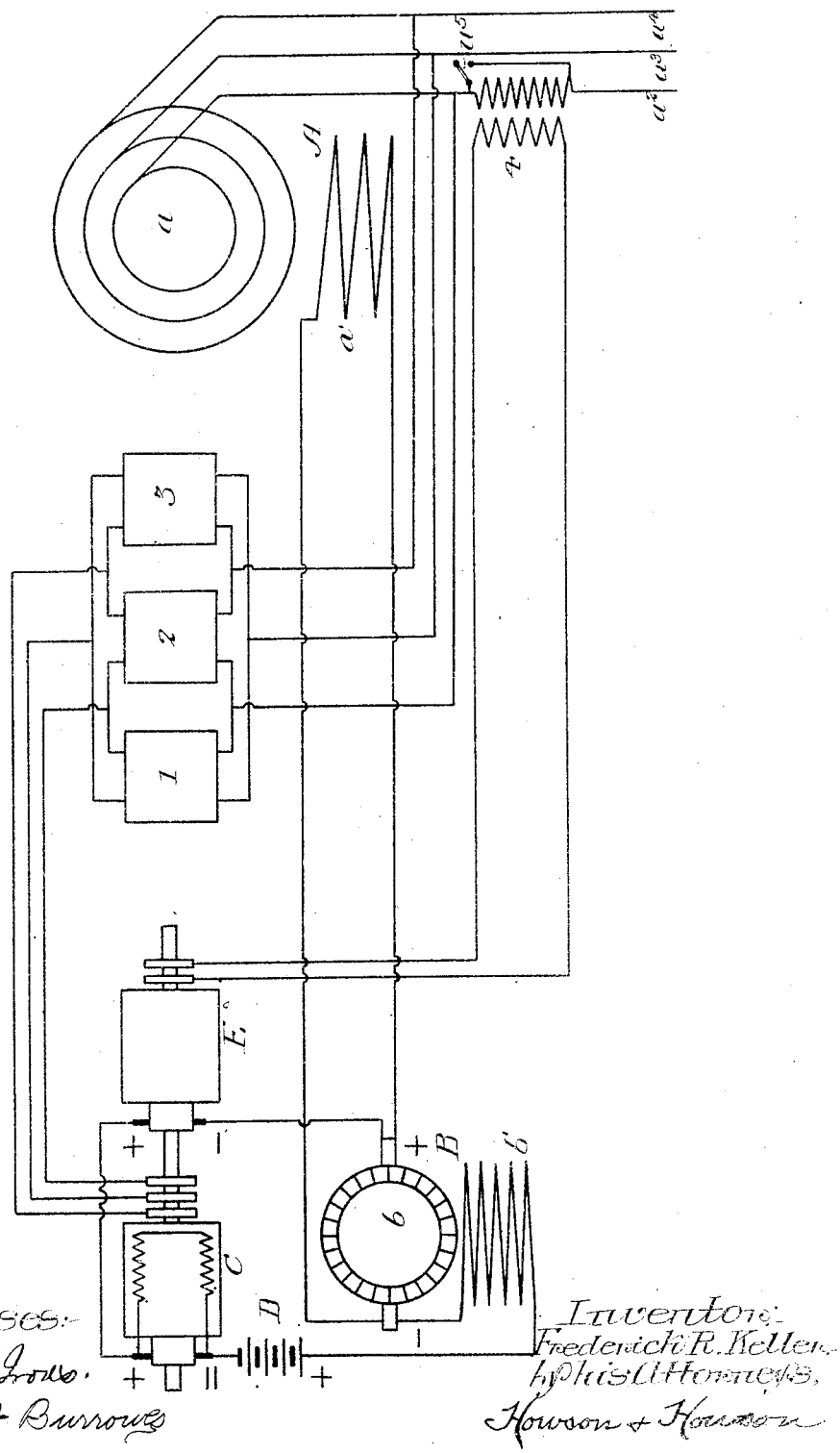

UNITED STATES PATENT OFFICE.

FREDERICK R. KELLER, OF LANCASTER, PENNSYLVANIA.

VOLTAGE-REGULATOR FOR ALTERNATING-CURRENT GENERATORS.

No. 846,214.           Specification of Letters Patent.           Patented March 5, 1907.

Application filed October 22, 1906. Serial No. 340,006.

*To all whom it may concern:*

Be it known that I, FREDERICK R. KELLER, a citizen of the United States, residing in Lancaster, Pennsylvania, have invented certain Improvements in Voltage-Regulators for Alternating-Current Generators, of which the following is a specification.

One object of my invention is to provide a system of apparatus for regulating the voltage of an alternating-current generator, so as to maintain it under operating conditions substantially constant either at the generator-terminals or at any distant point, as desired.

I further desire to provide a combination of apparatus so designed and connected that the voltage of the current generated by the exciter for an alternating-current generator shall be automatically varied to maintain the voltage of said generator substantially constant in spite of the drop due to its own impedance under load and of variation in the driving speed of the generator or exciter.

These objects, as well as other advantageous ends, I secure as hereinafter set forth, reference being had to the accompanying drawing, in which the figure is a diagrammatic view illustrating the preferred arrangement of apparatus and connections therefor constituting my improved system of apparatus.

In the above drawing, A represents an alternating-current generator whose voltage it is desired to regulate, it having an armature $a$ and a field-winding $a'$ and being designed to supply alternating current to current-mains $a^2$, $a^3$, and $a^4$.

For energizing the field-winding $a'$ I provide an exciter B, which in the present instance is a machine of the direct-current type having an armature $b$ and a field-winding $b'$. The machine B as a whole is so designed that under operating conditions its field is unsaturated, and consequently relatively small variations in its field-current will result in relatively large changes in the voltage of the current generated.

For regulating the voltage of the exciter B, and consequently the voltage of the alternator A, I provide a rotary converter C, having its alternating-current end connected to the current-mains $a^2$, $a^3$, and $a^4$ through suitably-designed potential-transformers 1, 2, and 3, while its direct current end is connected in series with the field-winding $b'$ of the exciter. Also connected in series with the exciter-field is a storage battery D, so arranged that under normal operating conditions its voltage balances or neutralizes, as nearly as may be, the voltage of the current generated by the rotary converter C. The connections of the battery and rotary with the exciter are such that current generated by the rotary tends to oppose the field-current of the exciter, and while, if desired, this circuit may contain merely the exciter B, the battery D, and the rotary C, I preferably also insert therein a second rotary converter E, having its alternating-current end supplied with current from a transformer 4, whose primary winding is in series with one of the current-mains. Its direct-current end is so connected in the circuit that the current generated by it tends to flow in the same direction as that generated by the exciter B and by the battery D, though it opposes the current generated by the rotary C. This rotary E is preferably driven from the shaft of the rotary C and may be of what is known as the "inductor" type.

Under normal operating conditions, with a full load on the generator A, the battery D and the rotary C are so designed and proportioned as to substantially neutralize each other, the current flowing through the field-winding $b'$ of the exciter B being that due to the voltage generated by the exciter plus that due to a small voltage generated by the rotary E. If now from any cause the voltage at the terminals of the generator A should fall, there would be a corresponding fall in the voltage of the alternating current supplied to the rotary C and a similar fall in the voltage of the direct current generated by it. As a consequence the battery-voltage would be in excess of that generated by the rotary C and an increased current would flow through the field-winding of the exciter In view of the unsaturated condition of the field of this machine there would at once be a relatively large increase in the voltage of the current generated by it, so that the field of the alternator A would be immediately strengthened and its voltage raised to an extent to compensate for the drop. Similarly, if for any reason the voltage of the alternator should increase this would result in a cutting down of the field-current of the exciter and a consequent relatively large falling off in the magnetizing-current of the main alternator, with a resulting lowering in ts voltage substantially equal to the previous increase.

The rotary E serves as a compounding or over-compounding device, for in the event of a heavy load being put upon the alternator A it is obvious that the voltage at the alternating-current terminals of said rotary would be increased. Since this results in an increase in the voltage of the direct current generated, there would be a corresponding increase in the current flowing through the exciter-field circuit and a resulting strengthening of the field of the alternator A, with the desired compounding effect in maintaining constant the voltage at some distant point in the circuit supplied by the mains $a^2$, $a^3$, and $a^4$.

It is of course obvious that the use of the battery D is not a necessity, since the rotary C and the exciter B could be so designed as to secure the desired effect without its use. I prefer, however, to use the battery or some equivalent source of constant voltage, for the reason that by so doing the effect of variations in the voltage of the direct-current end of the rotary C is magnified and the system as a whole is rendered more sensitive to changes in the voltage of the alternator A. It is further to be noted that the compounding rotary E may be altogether omitted if it be desired to dispense with its particular function, though under operating conditions I preferably employ it, as shown. If it be desired to temporarily cut said latter rotary E out of circuit, this may be done by short-circuiting the winding of the transformer 4 by means of a switch $a^5$.

I claim as my invention—

1. The combination with an alternating-current generator and its exciter, of regulating means consisting of a rotary converter, having its alternating-current end supplied from said generator and its direct-current end connected to oppose the current generated by the exciter, with a source of constant voltage connected in series with the direct-current end of the rotary converter to oppose the current generated thereby, substantially as described.

2. The combination with an alternating-current generator and its exciter, of a rotary converter having its alternating-current end supplied with current from said generator and its direct-current end connected in series with the field-winding of the exciter, with a storage battery also connected in series with the field-winding and so arranged that its voltage under normal conditions substantially equals and neutralizes that of the direct-current end of the rotary converter, substantially as described.

3. The combination with an alternating-current generator and its exciter, of two rotary converters having their alternating-current ends respectively supplied from the generator and from a series-transformer connected in the line, the direct-current ends of said rotaries being connected in series with the field-winding of the exciter, substantially as described.

4. The combination with an alternating-current generator and its exciter, of two rotary converters having their alternating-current ends supplied from said generator, the direct-current ends of said rotaries being connected in series with the field-winding of the exciter, the latter of the rotaries being connected to generate a current flowing in the same direction as that generated by the exciter and to oppose that generated by the other rotary, substantially as described.

5. The combination with an alternating-current generator and its exciter, of two rotaries having their alternating-current ends supplied from said generator, the direct-current ends of said rotaries being connected in series with the field-winding of the exciter, the rotor of one of said two rotaries being driven from the rotor of the other rotary, substantially as described.

6. The combination with an alternating-current generator and its exciter, of two rotary converters supplied with current from said generator and having their direct-current ends connected to the exciter, the rotor of one of the rotaries being driven from the rotor of the other, substantially as described.

7. The combination of a pair of rotary converters having their direct-current ends connected to oppose each other, a storage battery connected in series with the direct-current ends of said rotaries, and an exciter having its field-winding in circuit with the rotaries and the battery, with an alternating-current generator having its field-winding supplied from the exciter, the alternating-current ends of the rotaries being connected so that the voltage of the currents supplied thereto varies proportionately with the voltage of the alternating-current generator, substantially as described.

In testimony whereof I have signed my name to this specification in the presence of two subscribing witnesses.

FREDERICK R. KELLER.

Witnesses:
FORREST J. AULT,
EDW. R. HEITSHU